United States Patent [19]

Gardner

[11] Patent Number: 4,781,174

[45] Date of Patent: Nov. 1, 1988

[54] CREMATION APPARATUS AND METHOD

[76] Inventor: Kenneth H. Gardner, 408 Plantations Building, Bridgetown, Barbados,

[21] Appl. No.: 555,014

[22] Filed: Nov. 25, 1983

[30] Foreign Application Priority Data

Dec. 8, 1982 [GB] United Kingdom ............... 8234973

[51] Int. Cl.⁴ .............................................. F24J 2/00
[52] U.S. Cl. .................................. 126/452; 126/451; 110/194
[58] Field of Search ............... 126/451, 452, 417, 424, 126/425, 427, 438; 110/194

[56] References Cited

U.S. PATENT DOCUMENTS

| | | | |
|---|---|---|---|
| 681,095 | 8/1901 | Baker | 126/451 |
| 1,704,173 | 3/1929 | Chesney | 126/451 |
| 2,909,171 | 10/1959 | Löf | 126/451 |
| 2,976,533 | 3/1961 | Salisbury | 126/424 |
| 3,023,753 | 3/1962 | Wheless | 126/451 |
| 3,182,654 | 5/1965 | Culling | 126/424 |
| 3,236,227 | 2/1966 | Steinberg | 126/451 |
| 3,892,433 | 7/1975 | Blake | 126/425 |
| 3,938,497 | 2/1976 | Andrassy | 126/451 |
| 4,083,357 | 4/1978 | Fischer | 126/451 |
| 4,111,184 | 9/1978 | Perkins | 126/451 |
| 4,203,427 | 5/1980 | Way | 126/451 |
| 4,280,449 | 7/1981 | Kunstle et al. | 126/451 |
| 4,284,839 | 8/1981 | Johnson | 126/424 |
| 4,295,462 | 10/1981 | Bunch | 126/417 |

FOREIGN PATENT DOCUMENTS

2478280 9/1981 France ................. 126/451

Primary Examiner—Samuel Scott
Assistant Examiner—Noah Kamen
Attorney, Agent, or Firm—Holman & Stern

[57] ABSTRACT

Heat rays of the sun are concentrated and focussed by means of a reflective and/or lenticular device at a focal point for the purpose of the cremation of corpses, and their reduction to ashes thereby, either as a system per se or in combination with various ancillary buildings, equipment and facilities, more particularly an auditorium structure for conducting a funeral service or the like and from which a corpse may be transferred to the focal point of the concentrating device preferably by elevating the corpse through an opening in the ceiling and/or roof of the structure.

29 Claims, 10 Drawing Sheets

CREMATION APPARATUS AND METHOD

BACKGROUND OF THE INVENTION

Existing cremation techniques employ non-renewable energy fuels such as oil, gas, coal, or wood, which are becoming increasingly costly. Moreover, existing methods are unaesthetic, commonly involving the horizontal sliding or vertical descent of a corpse into an oven with psychologically undesirable connotations. Vertical descent, whether into a furnace or a grave, to the religious, may have connotations also of hellfire and damnation of the soul, as compared to the symbolisms of ascent upwards to Heaven, which, for the bereaved, is a much more acceptable symbolism, but which has not been available to date in any funeral facility. More basically, it has been man's dream for many thousands of years, particularly in ancient Egypt and in the Aztec religion, to be symbolically reunited in death with the sun as God and as the ultimate source of all life upon earth. The present invention makes this possible.

SUMMARY OF THE INVENTION

The present invention is based upon the concepts of (a) elevating a corpse through the ceiling and/or roof of a funeral auditorium or the like, to simulate ascent of the corpse to Heaven, and/or to raise it to a convenient work-level, and (b) utilizing concentrated solar energy for cremation of a corpse. These concepts may be used individually or in combination in a crematorium and the like.

In one preferred form, the invention may, for example, comprise a bowl or other solar reflecting and/or concentrating system for focussing the heat rays of the sun on a corpse on a grid with or without a corpse enclosing capsule and gaseous or other fuel supply and return lines, for the purpose of its cremation and reduction to ashes. The solar cremating system may be used in conjunction with a chapel or auditorium for funeral services and/or valedictions which features a roof-opening and a mechanism for raising a corpse, with or without a coffin, to a work level over the auditorium, where the corpse is placed on a grid with or without an enclosing capsule, which is then transferred by a suitable gantry or the like to the focal point of the solar concentrating system for cremation. The enclosing capsule may be equipped with supply lines for air, oxygen and gas or other fuel supply, and a return line the gaseous products of combustion. The gas or other fuel line supplies burners for auxiliary use during inclement weather and/or when it is desired to expedite the cremation process. Suitable ancillary service facilities are provided at roof level over the auditorium. Solar cremation equipment in accordance with the invention may be installed in combination with conventional cremation equipment, which may be used in inclement weather, or the systems may be used in combination to suit climatic conditions on a day-to-day basis.

It is one object of the invention to provide a solar-powered crematorium, which may include the combination of a ceiling-opening auditorium, a hoist, a suitable corpse grid or capsule, a transfer gantry or the like, and a solar incinerator.

DESCRIPTION OF THE PREFERRED EMBODIMENTS

Figure 1:
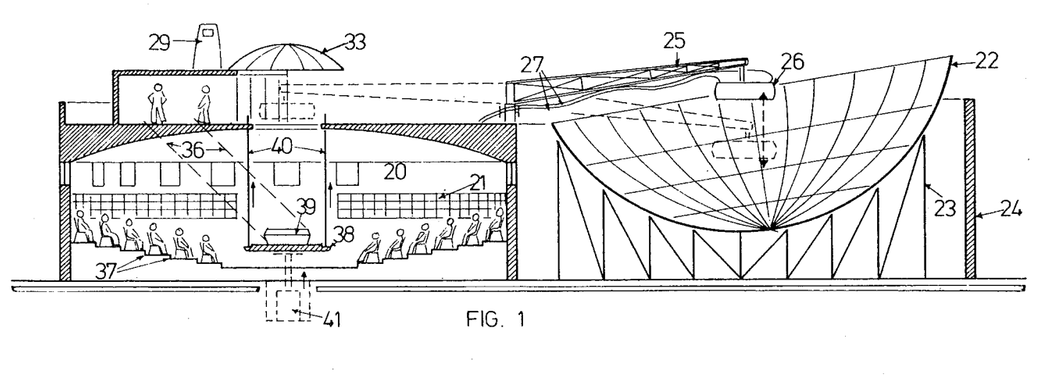
FIG. 1 is a longitudinal section through a crematorium comprising an auditorium and a solar energy concentrating bowl structure associated therewith.
Figure 2:
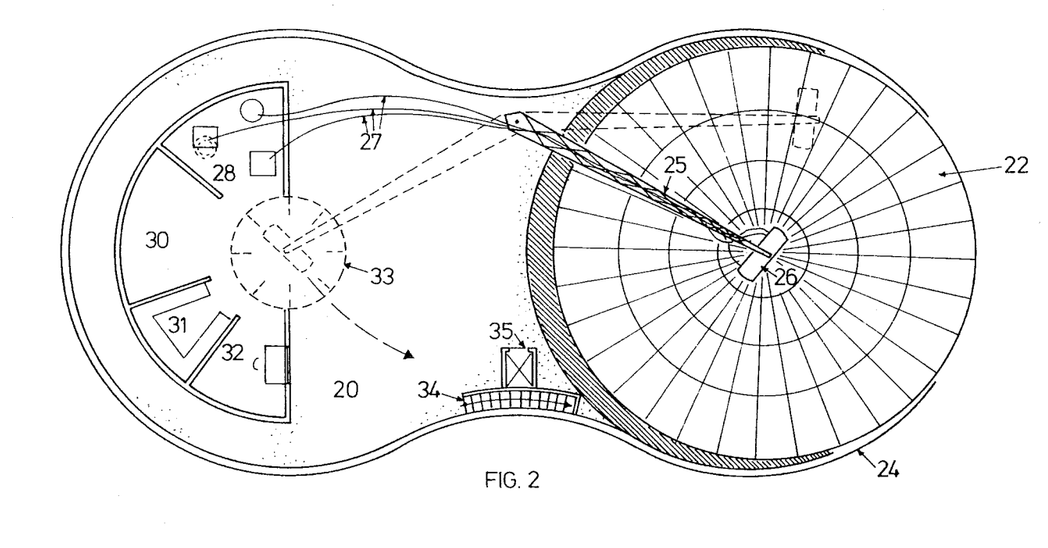
FIG. 2 is a plan view of the auditorium and bowl structure.

Referring intially to FIGS. 1 and 2 there is shown an auditorium chapel or meeting-house 20 of any suitable shape and size and of any suitable materials and construction, and a solar energy collecting and concentrating bowl 22 of hemispherical, parabolic, segmental or other suitable shape, on a suitable framework or other supporting base 23 either enclosed by suitable screen-walling such as 24 as shown, but which could be left open and exposed to view.

Also shown is a movable conveyor, hoist, or gantry 25 for carrying from over the auditorium 20 to the variable focal point of the bowl 22, a cremation grid and/or capsule 26, and there tracking manually or automatically in known manner the movement of the sun. Alongside or attached to the gantry 25 are shown various supply and return lines 27, flexible or rigid, for supplying auxiliary fuel such as gas or oil, and oxygen and/or fresh air to promote and expedite combustion to the capsule 26, for the incineration of its contents, and for returning the gaseous and/or liquid products of oxidation and/or combustion of said contents to a plant-room 28 containing all necessary supplies and suitable equipment including purifying and deodorizing baths, and supplied with a suitable chimney 29, vents, windows, etc. Adjacent to the plant-room 28 are shown a general service and workshop area 30, storage room 31 for coffins etc., and the cremation control room 32. Additional rooms, washrooms, services, and the like including one or more conventional cremation retacts may be added as required, in any suitable construction.

Adjacent to the above rooms is a roof 33 preferred as shown of circular shape and made of clear or translucent glass or plastic, on suitable framework or frameless, but which may alternatively be tinted obscured or solid and of a shape other than circular. This roof 33 may also be removable or omitted altogether in favor of the clear open sky, as may be preferred. Stairs 34 and elevator 35 are shown.

The following features are also shown on the section through the auditorium 20: suitable seating areas 37, a movable platform 38 or altar of any suitable material preferred as shown in circular shape, but which may be of any other desired and/or suitable shape, with or without sliding gear or rails (not shown) to receive a corpse 39 with or without an enclosing coffin, and operated in a vertical direction by any suitable number of elevating cables or rods 40, or alternatively by one or more hydraulic hoist column(s) 41, shown dotted.

The function of the platform 38 is to serve as an altar and/or catafalque for the corpse 39 during any desired ceremony and/or valediction, and thereafter to raise it to roof-level. It should be noted that the dramatic effect of the disappearance from view of the corpse will be enhanced by the closing of the circular roof-light, symbolizing death as "the light going out". At roof-level of the auditorium 20 the corpse, with or without coffin, is placed on or in the grid or capsule 26 which is then swung over by means of the gantry 25 and raised or lowered thereby into the focal point of the solar bowl 22 for cremation. It should be noted that the capsule 26 will also be provided with lines 27 for fuel such as gas or oil for auxiliary burners for expediting the cremation in the event of inclement weather, pressure of bookings, and so forth, and also for fresh air and/or oxygen, and for return of the products of combustion (gaseous and/or liquid) for further treatment at room 28. An alternative inclined route 36 of the corpse through auditorium roof (or upper walls) to service area is shown (FIG. 1).

Figure 3:
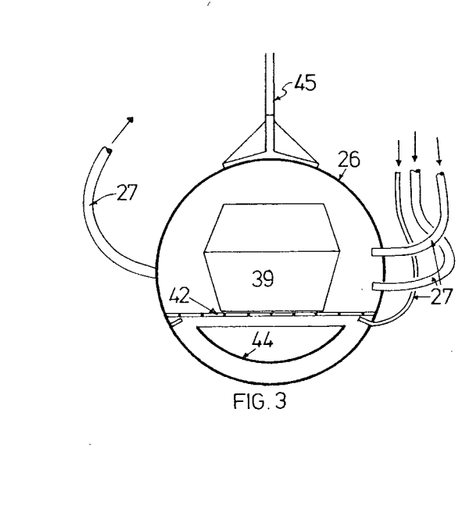
FIG. 3 is a section through a corpse-bearing grid and enclosing capsule for use in the installation shown in FIGS. 1 and 2.
Figure 4:
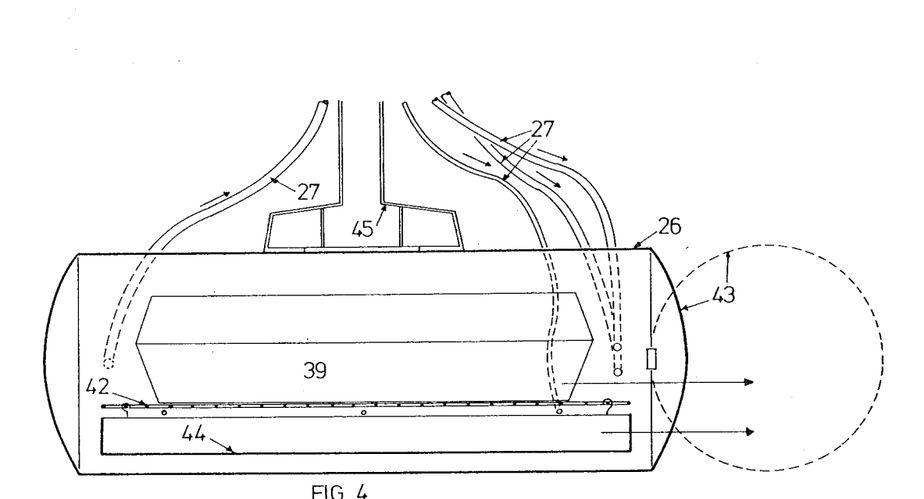
FIG. 4 is a longitudinal section through the grid and capsule.
Figure 5:
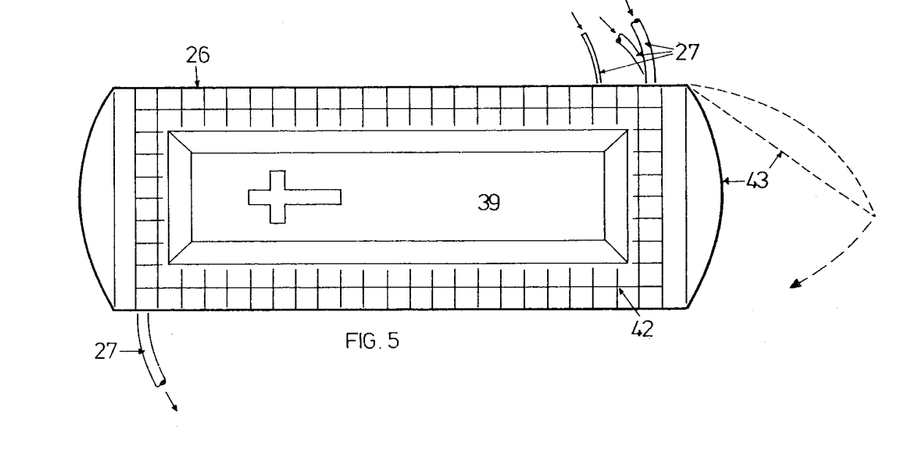
FIG. 5 is a plan view of the grid and capsule.

Referring now to FIGS. 3, 4 and 5, these show sections and plan of capsule 26 for containing corpse 39, with or without a coffin, and served with the various supply and return lines 27 for the purposes already described. The corpse 39 may rest on a grillwork support grid 42 of metal, ceramic, or other suitable material either with or without a suitable sliding mechanism for the easy insertion and/or withdrawal of the corpse 39 through the access door 43 which is to be provided with suitable heat-resistant sealant cushioning and/or rebates. Under the grillwork grid 42 is located a removable tray 44 for the collection and subsequent removal of all non-gaseous products of combustion. The capsule 26, which may be suspended by means of a suitable bracket 45 from the gantry 25 may be of metal, ceramic, or other heat-resistant material, with or without insulation, of the shape shown or of any other suitable shape, and is intended in a preferred embodiment to be sealed during the cremation process to avoid the escape of heat and of undesirable odors. In a preferred embodiment it is intended that the upper half of the capsule 26 is to be insulated and/or heat-reflective, while the lower half is to be heat-absorbent and non-insulated in order to receive and transmit heat radiated from solar bowl 22.

The capsule 26 may be detatchable from the gantry bracket 45, or the bracket itself may be detatchable from the gantry, since in practice, it is intended to provide three or more capsules 26 in order to permit concurrent preparation, cremation, and cleaning of the capsules 26, either in service area 30 or on other available flat roof areas over the auditorium 20, in the interests of rapid turnover.

After cremation, the gantry 25 may swing the capsule 26 over to the work areas described above where, after either natural or induced cooling thereof, bones can be pulverised either manually or mechanically and the ashes collated and/or compressed into a suitable urn or other container for presentation to the next of kin of the deceased and/or for interment in columbaria which may be provided inside and/or outside the auditorium 20, and for which a multiplicity of systems and details is possible.

Figure 6:
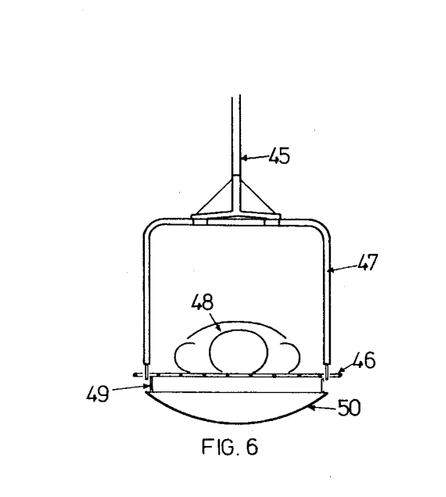
FIG. 6 is a cross section through an alternative corpse-bearing grill for use in the installation shown in FIGS. 1 and 2.
Figure 7:
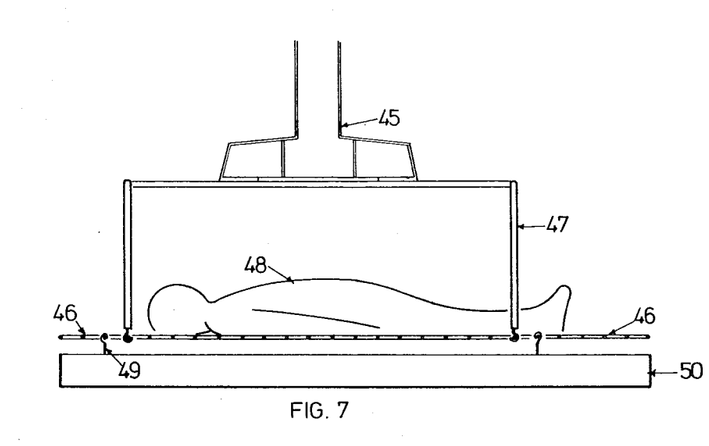
FIG. 7 is a longitudinal section through the grill assembly.
Figure 8:
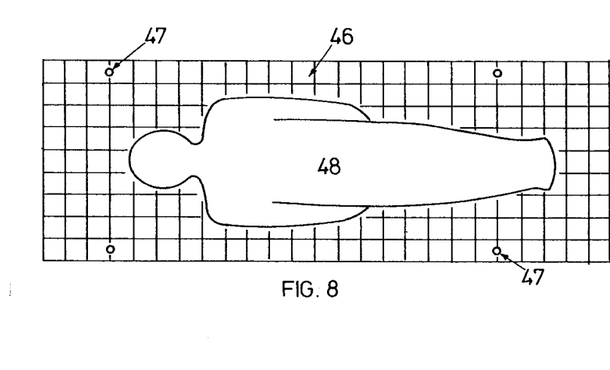
FIG. 8 is a plan view of the grill assembly.

FIGS. 6, 7 and 8 show an open grill 46 of metal, ceramic or other suitable material with suitable supports 47 for the attachment (removable) to gantry bracket 45 instead of capsule 26. The grill 46 is to carry an exposed or shrouded corpse 48 (i.e. without coffin) and underneath it is attached with suitable hooks 49, and an oven-glass or metal (or a combination of these or other suitable materials) removable drip and ash collector tray 50. It is intended that this type of open grill (i.e. without coffin or sealed capsule) should be used in those countries such as India, where open cremation on burning-ghats is traditional and exception not taken to the sight, sound and smell of cremation. Under such circumstances, or in Western communities where the cremation may be separated from the auditorium and/or remote from public or residential areas, the collection tray 50 may be omitted, since the cremation process will be expedited by this. The design of the solar bowl in such circumstances can be such as to leave an aperture in its base sections for the dripping and/or collection of the products (solid) of combustion conveniently at ground level.

A temperature of about 1,700° F. is required to provide incineration and a total of about 3,000,000 BTU's is required to consume a corpse. Thus, at a supply rate of about 1,000,000 BTU/hour, cremation would take about three hours. A concave mirror-reflector bowl similar to the steam-producing Crosbyton hemisphere in Lubbock, Texas is considered a suitable collector. At 65 ft. diameter, a bowl of this type can produce approximately 1,000,000 BTU/Hr. under full sunshine conditions from mid-morning to mid-afternoon.

Figure 9:
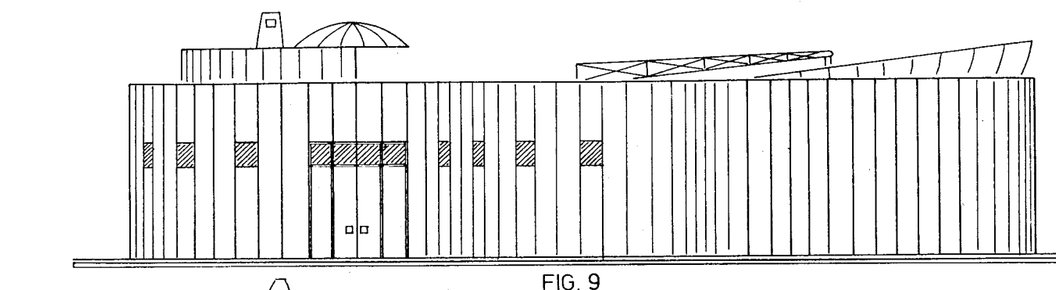
FIG. 9 is an outer elevational view of the crematorium shown in FIGS. 1 and 2 in a preferred embodiment.
Figure 10:
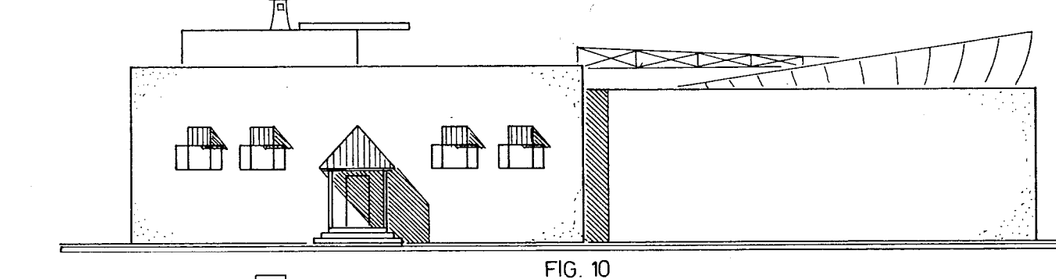
FIG. 10 is an elevational view of the crematorium showing an alternative architectural design treatment.
Figure 11:
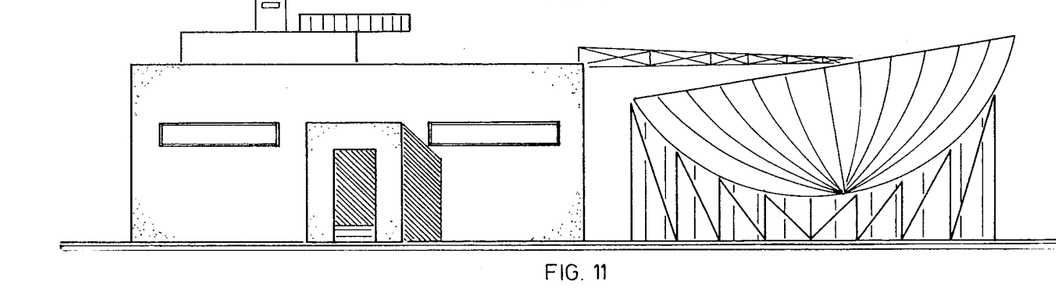
FIG. 11 is an elevational view of the crematorium showing another variant of the architectural treatment.

Referring now to FIG. 9, this shows a preferred architechtural treatment for a crematorium of the type previously described, while FIG. 10 and FIG. 11 show for illustrative purposes two of an infinite number of possible alternative architectural treatments of the basic preferred embodiment illustrated in the other drawings. It should also be noted that the solar bowl may be located over the auditorium, or laterally remote from it, or recessed into the ground, as may also be the auditorium.

Figure 12:
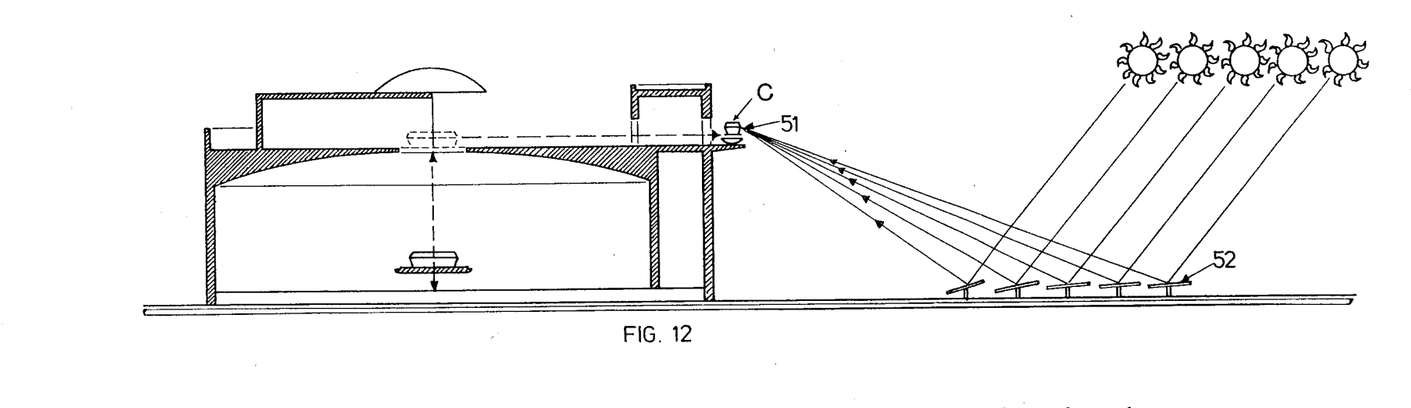
FIG. 12 is a longitudinal sectional view showing an alternative crematorium in accordance with the invention wherein solar energy concentration is performed by a series of low-level reflectors which track the sun, and a corpse is exposed in a fixed position at their focal point.
Figure 13:
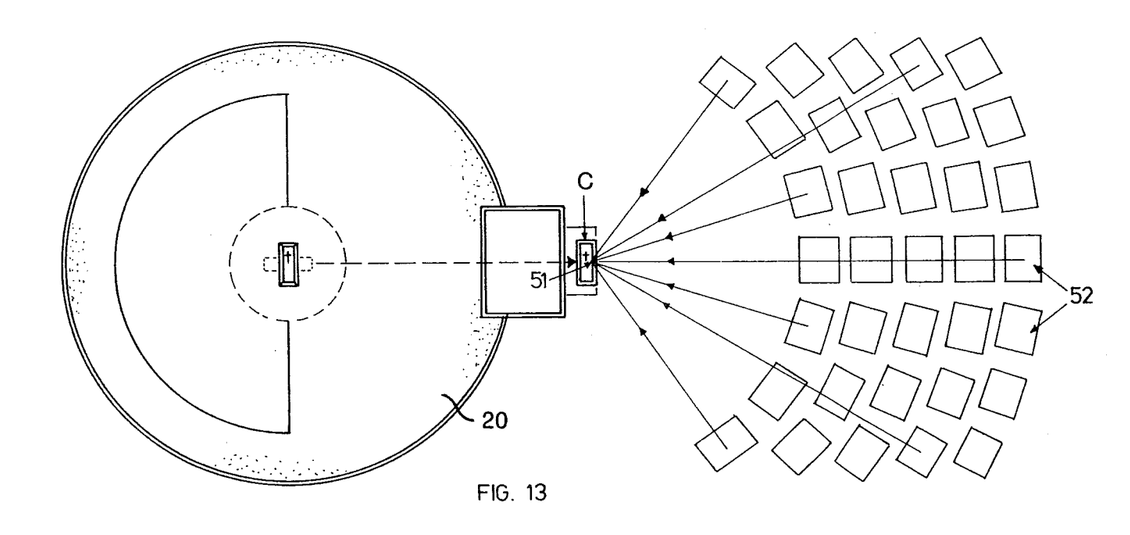
FIG. 13 is a plan view of the crematorium shown in FIG. 12.

Referring now to FIG. 12 and FIG. 13, these show a variant of the invention having a fixed focal point 51 for the cremation of corpse C (which may be capsule or coffin contained, or may be exposed), in combination with movable variable-focus sun-tracking reflectors 52, as an alternative to the fixed-bowl and sun-tracking gantry 25 shown in FIGS. 1 and 2. Again in this embodiment, the corpse may be elevated through the roof of auditorium 20 and suitably transferred to point 51.

Figure 14:
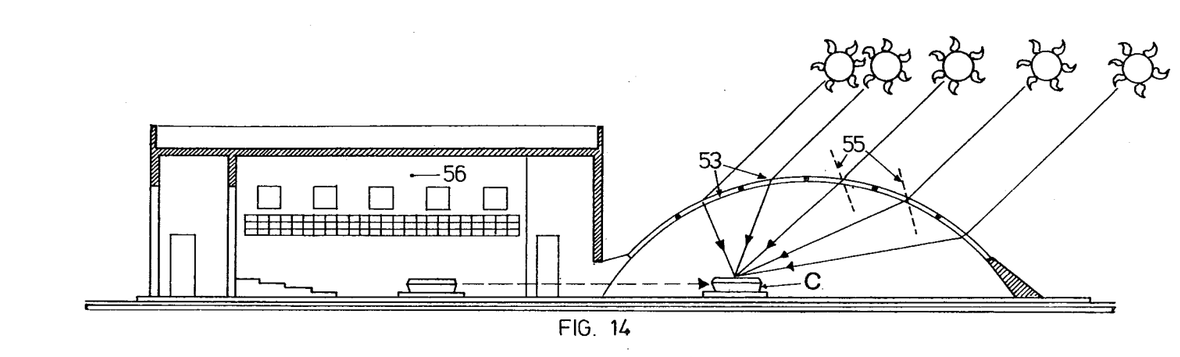
FIG. 14 is a longitudinal sectional view of another form of crematorium in accordance with the invention wherein solar energy concentration is performed by Fresnel or other lenses over a corpse.
Figure 15:
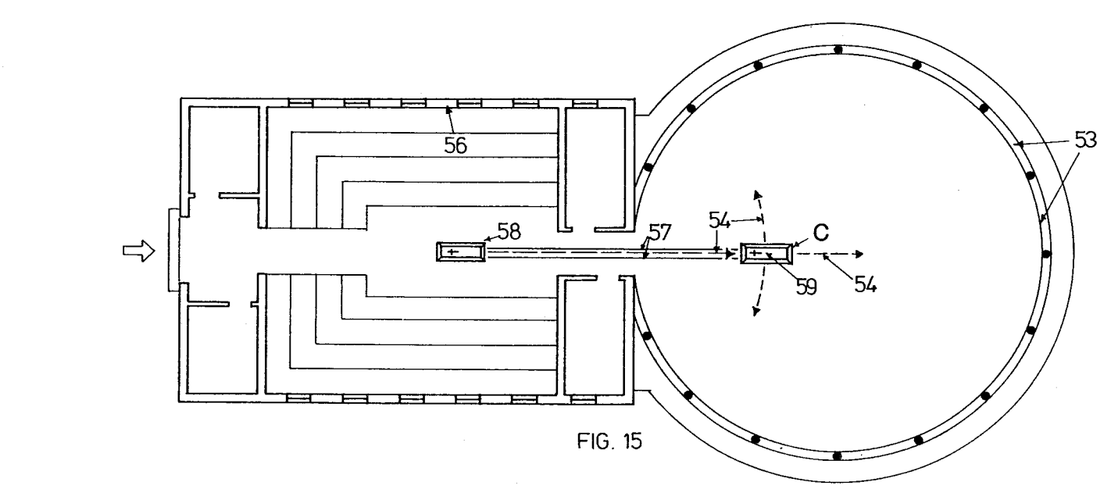
FIG. 15 is a plan view of the crematorium shown in FIG. 14.

Referring to FIGS. 14 and 15, these show another variant of the invention wherein the heat rays of the sun are concentrated by Fresnel or other type lenses 53 located over the corpse C which may be exposed or in a coffin or capsule, as previously. In this variant either the item being cremated may move in the directions shown by the arrows 54 to track the sun, or alternatively the lenses 53 can move to track the sun as shown by the dotted lines 55. It should be noted that in this variant the lenses need not necessarily be in a domed structure as drawn, but may be laid flat or in various other arrangements owing to the ray-bending properties of the Fresnel-type lenses. The drawings of this variant show another architectural variant design for an auditorium 56, with no opening through the roof, but with all necessary seating and ancillary and service rooms. In this variant the corpse is moved horizontally out of the auditorium to the point of cremation and this embodiment therefore foregoes the dramatic and psychological advantages of the hoisting upwards of the corpse featured in the other variants. However, an offsetting advantage is the easy and smooth conveyance of the corpse by rail or rails 57 from its position 58 in the auditorium 56 to the focal point 59 under the lenses 53. Also advantageous is the fact that the whole system may be operated manually in the event of a power failure. In view of the enclosed nature of this variant the use of a sealed capsule is optional, as the gaseous by-products of combustion would be retained by the enclosure of lenses. It might however be found to be more advantageous to have openings and airspaces between the lenses in which case a sealed capsule such as capsule 26 may be used.

It should be noted also that the equipment comprising the invention can be used between cremations for the generation of electricity and/or steam power for sale or commercial use, or alternatively that it may form an adjunct to n existing power-generation bowl such as that at Crosbyton, USA, thus permitting the performance of cremations as an interruption of the regular use thereof for the production of commercial power.

It should also be noted that with minor changes the invention may be used for the cremation of the corpses of animals, including pet animals.

Figure 16:
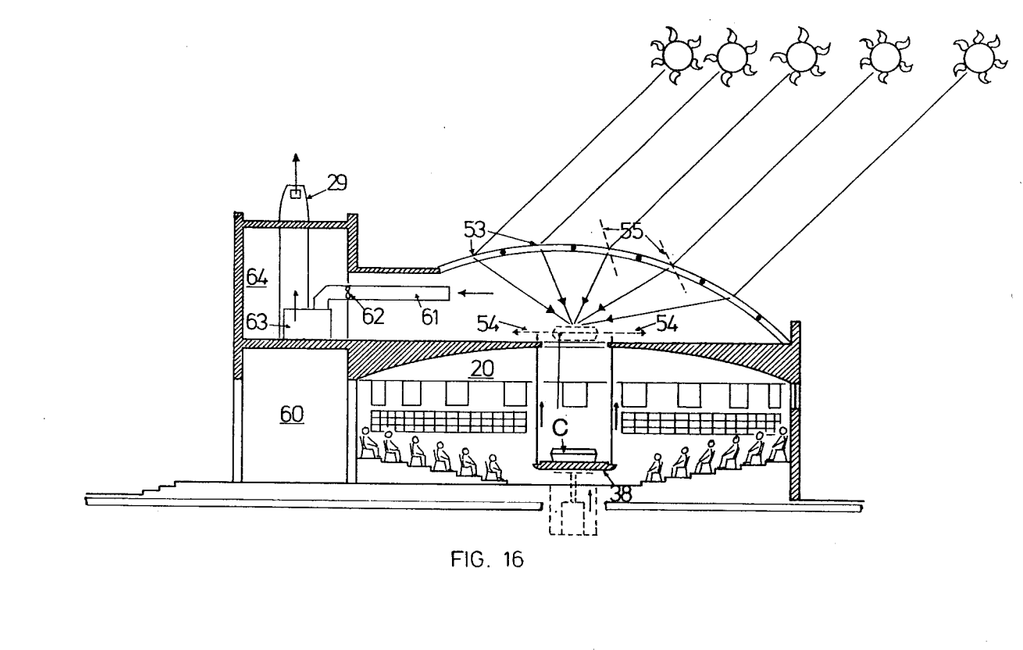
FIG. 16 is a sectional view through another form of crematorium in accordance with the invention wherein solar energy concentration is performed by Fresnel or other lenses over a corpse.

Referring now to FIG. 16, this shows another variant of the invention more specifically of the arrangement shown on FIGS. 14 and 15 and described above. In this variant the item C to be cremated is drawn or hoisted up through the roof of the auditorium 20 and moved manually or mechanically to the focal point of a system of Fresnel or other lenses 53 which in this variant are located over rather than alongside the auditorium, thereby retaining the dramatic and psychological advantages which the arrangement, shown in FIGS. 14 and 15 would have to forego. If a fixed set of lenses are used as shown at 53 this creates an enclosure enabling one to dispense with any other capsule as the gaseous products of combustion can be drawn through a duct 61 by means of a fan or fans 62, thence through a purifying and deodorizing treatment 63 in a work-room 64, and thence dispersed through the chimney 29. The inlet source of the air for combustion would most conveniently be around the perimeter of the platform 38 from the auditorium through suitable slots. The platform 38 would remain at the top in a visually closed position during the cremation. If pivoting lenses 55 are used or if for any other reason the structure over the item C for cremation is not of an enclosed or sealed nature, then either a sealed capsule such as that detailed in FIGS. 3, 4 and 5 may be used or, in countries where this is found to be acceptable aesthetically, a completely open grill such as that detailed in FIGS. 6, 7 and 8 may be used.

Figure 17:
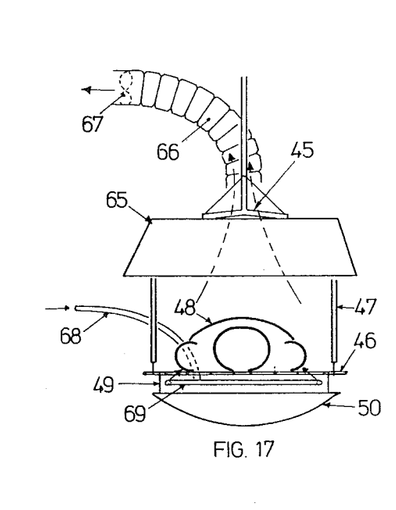
FIG. 17 is an end elevational view of an alternative form of corpse grill incorporating a fume canopy, air exhaust duct and fan.
Figure 18:
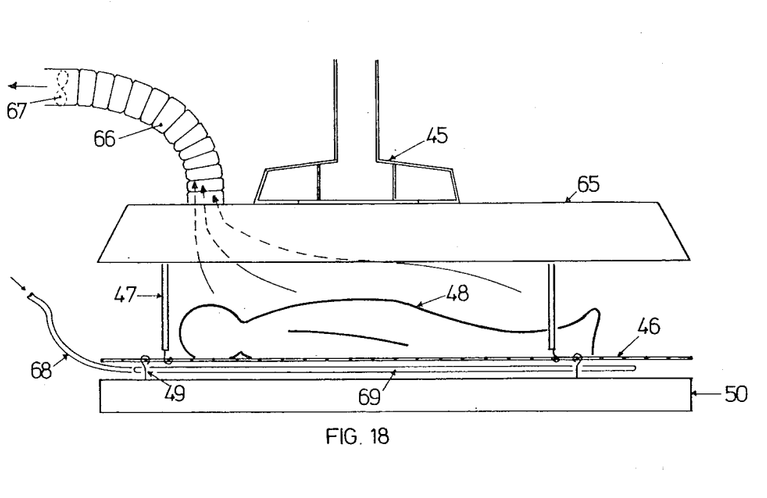
FIG. 18 is a side elevational view of the grill shown in FIG. 17.
Figure 19:
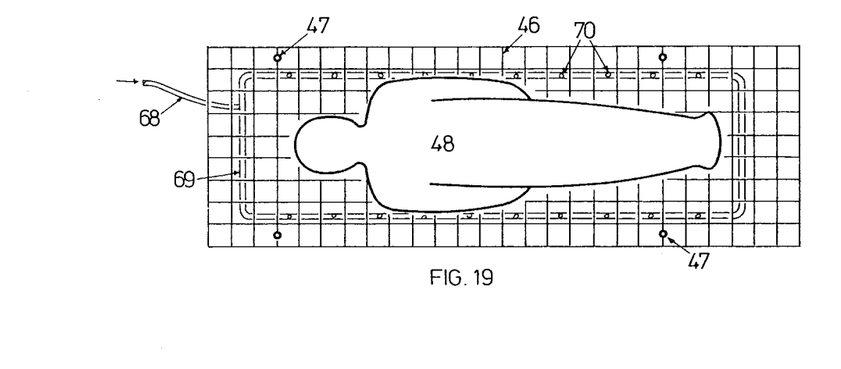
FIG. 19 is a plan view taken below the canopy, of the grill shown in FIGS. 17 and 18.

Referring now to FIGS. 17, 18 and 19, these show an open grill of which items 45, 46, 47, 48, 49, and 50 are similar to the items shown in FIGS. 6, 7 and 8, but shown in addition are a canopy 65 of sheet metal or any other suitable material, a flexible or articulated duct 66 of any suitable material, and an exhaust fan 67 or fans for the conveyance of the gaseous products of combustion to a suitable purifying and deodorizing plant and chimney such as earlier described. Also shown are a supply line 68 and pipe manifold 69, the latter having burner-nozzle jets 70 for auxiliary and/or alternative cremation whenever the available solar energy may be inadequate or absent. As an alternative to the other grill or capsule previously described, this combination of grill and exhaust canopy may be used with any of the variants of the invention except those using overhead lenses (FIGS. 14, 15 and 16), and it offers more rapid and direct cremation than does the capsule 26, while retaining some of the advantages such as the deodorization of the products of combustion. The capsule 26 however retains the advantages of silencing the sounds of the combustion and of obscuring the process from view, in countries where these considerations are viewed as important.

It should be noted that while this has not been shown on FIGS. 6, 7 and 9 for the non-canopied grill, it is obviously the intention that both the open grill (FIGS. 6, 7 and 8) and the grill with canopy (FIGS. 17, 18 and 19) would have lines for fuel such as gas or oil for auxiliary burners for expediting the process of combustion in the event of inclement weather, pressure of bookings, and so forth, just as would the sealed capsule alternative.

It should further be noted that in the cases of lens systems for concentrating the solar energy, the collection trays 50 under the corpse should be solid and reflective rather than transparent or translucent, and that the capsule 26, if used, should have its upper half dark and absorbent, and its lower half reflective, rather than the other way round as previously described for use with bowl or other concentrating systems where the radiated energy comes from below.

Figure 20:
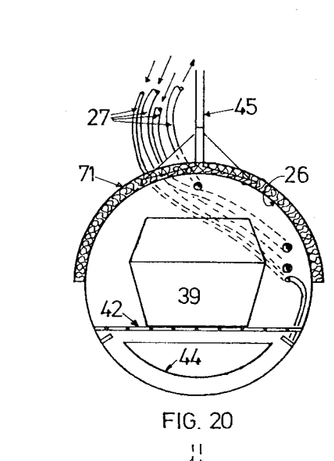
FIG. 20 is a cross-sectional view through an alternative form of corpse-bearing capsule.

FIG. 20 is a cross-sectional view through an alternative form of corpse-bearing capsule, wherein insulation 71 of a suitable heat-resisting material and of a suitable thickness is added to the upper half of the capsule 26 shown in FIGS. 3, 4, and 5, when said capsule is used with a reflected solar heat source from below. The said insulation is also to remain in position during the use of any auxiliary fuel to promote combustion.

Figure 21:
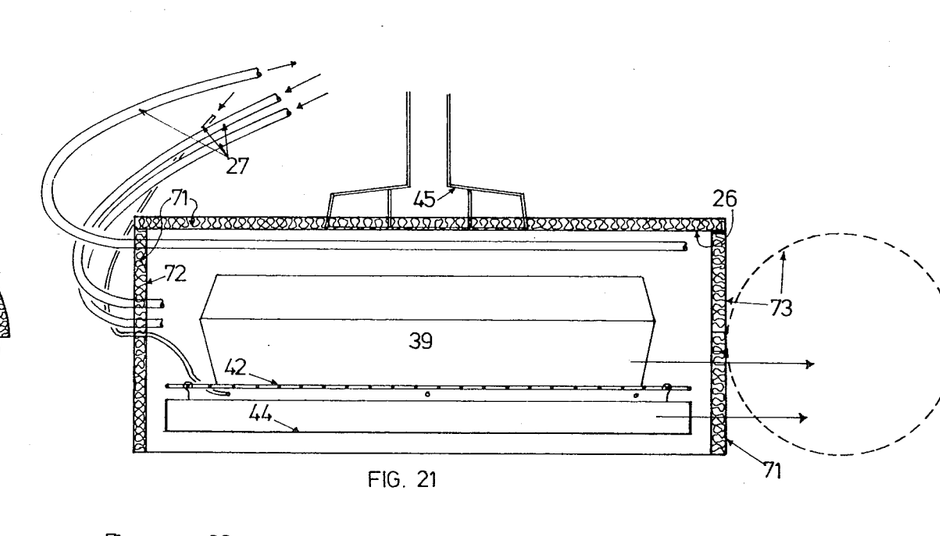
FIG. 21 is a longitudinal view through the capsule shown in FIG. 20.
Figure 22:
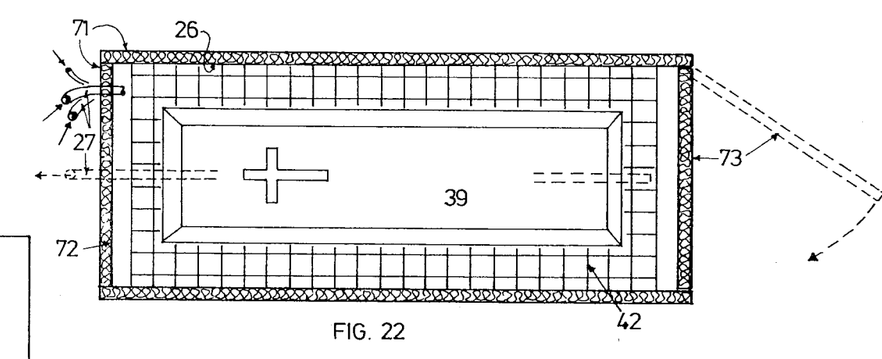
FIG. 22 is a plan view of the capsule.

FIG. 21 is a longitudinal section through the capsule shown in FIG. 20 but showing in addition insulation 71 on the capsule's fixed end 72 and on its door 73, which latter items are shown flat on this variant rather than dome-shaped as hitherto.

Figure 23:
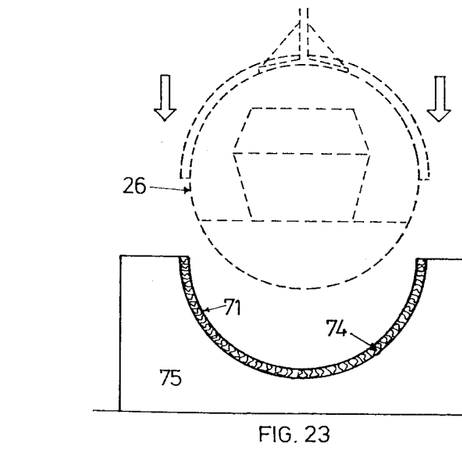
FIG. 23 is a sectional view through an insulation bed.

FIG. 23 is a section through an insulation bed 74 made of insulation as described above, to run the same length as the capsule 26 (here shown dotted) and to receive same whenever auxiliary partial or total cremation by means of gas, oil or electricity is to be performed. The insulation bed 74 is carried in a supporting cradle 75 of any suitable heavy, medium, or lightweight material and construction, and which may be either movable or fixed.

Figure 24:
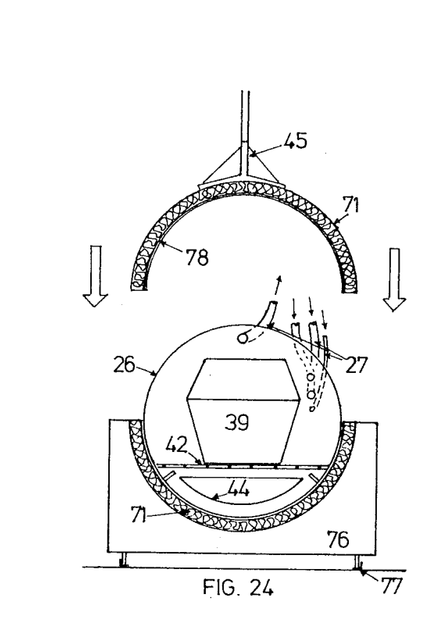
FIG. 24 is a sectional view through another form of capsule.
Figure 25:
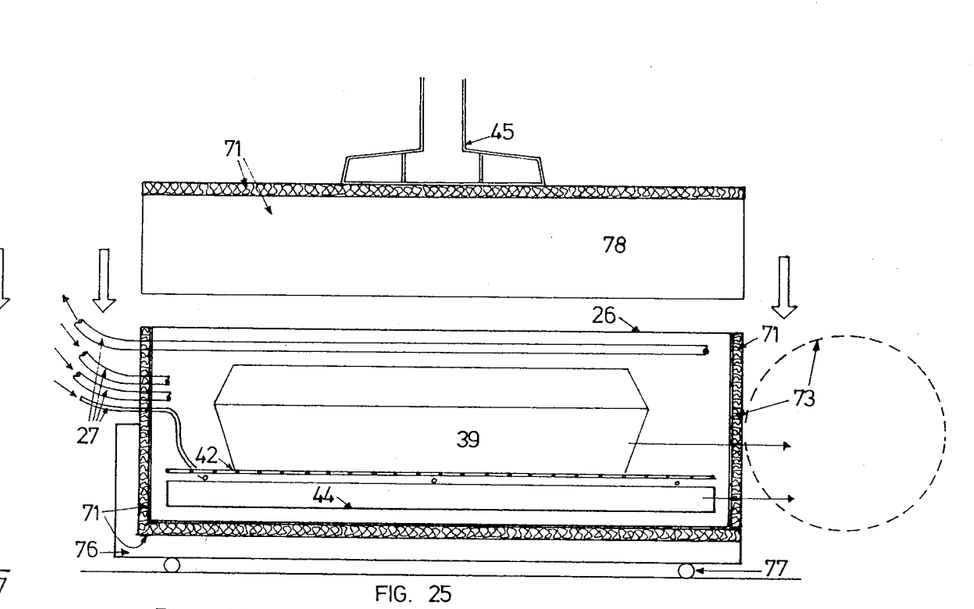
FIG. 25 is a longitudinal sectional view of the capsule shown in FIG. 24.
Figure 26:
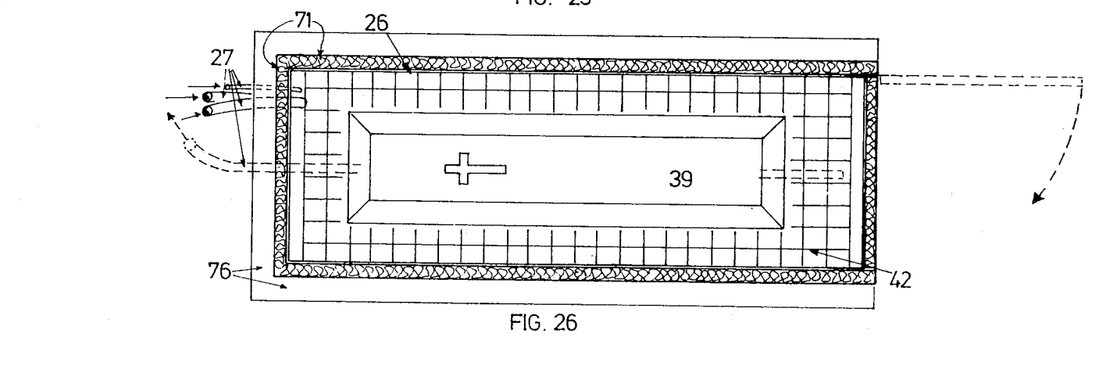
FIG. 26 is a plan view of the capsule shown in FIG. 24.

FIGS. 24, 25 and 26 illustrate a further variant of the capsule in accordance with the invention wherein insulation 71 as described above is added to the lower half of the capsule 26 shown in FIGS. 3, 4 and 5, when the capsule is used under an overhead lenticular solar or other heat source. The capsule is seated in a movable supporting cradle 76 of any suitable light or medium weight material and construction, on runners or wheels 77 to facilitate movement to the focal point of the Fresnel or other lens system or other overhead heat source, such as 53, shown on FIGS. 14, 15 and 16. The insulation shown between the capsule 26 and the cradle 76 may be attached to either one of these items, but the latter is considered more convenient.

Supported from a suitable gantry-bracket 45 or by any other convenient means a movable cap 78 made out of or incorporating insulation 71, as described above, may be lowered over and onto the capsule 26 whenever auxiliary partial or total cremation by means of gas, oil o electricity is to be performed.

It should be noted that the capsule 26 need not necessarily be circular in section as shown on the drawings throughout, but may be flat-bottomed (to prevent rolling), oval in section, or square, rectangular, hexagonal, octagonal, or any other desired shape.

It should also be noted that one or more laser ray systems may be used as an auxiliary means of cremation, or for the total cremation process, in lieu of or together with solar energy, gas, oil, or electricity.

Further, in all of the variants described above, one or more standard, commercially available, or other oil, gas or electrically fired crematory retorts or furnaces may be incorporated with the apparatus for standby use, for use in inclement weather, or for increasing the capacity of the crematorium. Such auxilliary devices may be used, as conditions dictate, for partial or complete incineration of a corpse, in combination with the solar cremation equipment, with the one form of equipment being an auxilliary to the other.

While only preferred embodiments of the invention have been described herein in detail, the invention is not limited thereby, and modifications can be made within the scope of the attached claims.

I claim:

1. A method of cremating a corpse comprising elevating the corpse through an opening in the roof of an auditorium to simulate ascent of the corpse to Heaven, then focussing concentrated radiant solar heat on the corpse to provide at least partial incineration thereof.

2. The invention of claim 1 wherein incineration of the corpse is effected partially by solar energy and partially by the combustion of a fossil fuel or electricity.

3. The invention of claim 1 wherein the radiant solar heat is concentrated by a solar reflecting bowl and is focussed on the corpse by positioning the corpse at the focal point of the bowl.

4. The invention of claim 3 which includes moving the corpse in the bowl so as to track the sun.

5. The invention of claim 1 wherein the radiant solar heat is concentrated by sun-tracking reflectors at a fixed focal point and the corpse is positioned at said point.

6. The invention of claim 1 wherein the radiant solar heat is concentrated by sun-tracking lens means at a fixed focal point and the corpse is positioned at said point.

7. Cremation apparatus comprising focussing means for concentrating radiant solar heat on a corpse to provide at least partial incineration thereof, means for supporting the corpse at a focal point of said focussing means, an auditorium structure having a roof opening, a corpse platform, elevating means for raising the corpse platform through the roof opening to simulate ascent of the corpse to Heaven, and transfer means for moving the corpse from said platform responsive to ascent through said opening to said focal point.

8. The invention of claim 7 wherein the focussing means comprises a solar reflecting bowl.

9. The invention of claim 8 wherein the supporting means includes means for moving the corpse within the bowl so as to track the sun.

10. The invention of claim 9 wherein the supporting means includes a movable gantry.

11. The invention of claim 7 wherein the focussing means comprises sun-tracking reflector means for concentrating radiant solar heat at a fixed focal point, and the supporting means is positioned at said point.

12. The invention of claim 7 wherein the focussing means comprises sun-tracking lens means for concentrating radiant solar heat at a fixed focal point, and the supporting means is positioned at said point.

13. The invention of claim 7 wherein the transfer means comprises a gantry for swinging the corpse from said platform to said focal point.

14. The invention of claim 7 wherein the supporting means comprises an open corpse-supporting grid structure.

15. The invention of claim 14 wherein the supporting means includes a collector tray under the grid structure.

16. The invention of claim 14 wherein the supporting means includes means for suspending the grid structure from a gantry and the like.

17. The invention of claim 14 wherein the supporting means includes extractor means over the grid structure for the removal of gaseous products of combustion.

18. The invention of claim 14 wherein the supporting means includes auxilliary burner means under the grid structure for providing heat to incinerate a corpse if required.

19. The invention of claim 7 wherein the supporting means includes a corpse-receiving enclosure capsule having an internal corpse support grid, a sealable access a collector tray under the grid and fuel supply and delivery means communicating with the interior of the capsule.

20. The invention of claim 19 wherein a part of the capsule is heat absorbent for receiving heat radiated from said focussing means and transmitting same to a corpse within the capsule, and the remainder of the capsule is heat insulated.

21. The invention of claim 20 wherein the lower part of the capsule is heat absorbent, the upper part being provided with insulation, and wherein an insulated cradle is provided for receipt of the lower part of the capsule when a corpse is to be incinerated by means of said burner means per se.

22. The invention of claim 21 wherein the cradle is provided with wheels.

23. The invention of claim 21 wherein said insulation comprises a removable cap for the capsule.

24. The invention of claim 23 wherein said cap is associated with a bracket for suspending the capsule from a gantry and the like.

25. The invention of claim 14 wherein the elevating means comprises a fluid-pressure operated hoist.

26. Cremation apparatus comprising focussing means for concentrating radiant solar heat on a corpse to provide at least partial incineration thereof, means for supporting the corpse at a focal point of said focussing means, an auditorium structure having an internal support platform for the corpse, means for moving the platform to the exterior of the auditorium structure through an opening in the structure, and transfer means for moving the corpse from said platform to said focal point responsive to movement of the platform to the exterior of the structure.

27. The invention of claim 26 wherein the opening is in the roof of the auditorium structure, and the means for moving the platform comprises means for elevating the platform from audience level in the auditorium structure through the opening.

28. The invention of claim 26 wherein the focussing means comprises a solar reflecting bowl, and the transfer means comprises a gantry for transferring the corpse from the platform to the focal point of the bowl.

29. The invention of claim 26 wherein the focussing means comprises sun-tracking reflector means for concentrating radiant solar heat at a fixed focal point, and the supporting means is positioned at said point.

* * * * *